United States Patent
Mielke et al.

(10) Patent No.: US 10,239,160 B2
(45) Date of Patent: Mar. 26, 2019

(54) SYSTEMS AND PROCESSES THAT SINGULATE MATERIALS

(75) Inventors: Michael Mielke, Santa Rosa, CA (US); Ramanujapuram A. Srinivas, San Jose, CA (US); Tim Booth, Penngrove, CA (US); Thor Wilbanks, Berkeley, CA (US)

(73) Assignee: Coherent, Inc., Santa Clara, CA (US)

(*) Notice: Subject to any disclaimer, the term of this patent is extended or adjusted under 35 U.S.C. 154(b) by 0 days.

(21) Appl. No.: 13/239,323

(22) Filed: Sep. 21, 2011

(65) Prior Publication Data

US 2013/0068736 A1    Mar. 21, 2013

(51) Int. Cl.
   *B23K 26/00*   (2014.01)
   *B23K 26/14*   (2014.01)
   (Continued)

(52) U.S. Cl.
   CPC .......... *B23K 26/38* (2013.01); *B23K 26/0006* (2013.01); *B23K 26/359* (2015.10);
   (Continued)

(58) Field of Classification Search
   CPC .. B23K 26/381; B23K 26/388; B23K 26/383; B23K 26/4065; B23K 26/38; B23K 26/0036; B23K 26/0042; B23K 26/0045; B23K 26/367; B23K 26/407; B23K 26/0087; B23K 2201/40; H01L 31/00; H01L 21/78; H01L 21/683; B29C 2035/0838; G01N 29/28; G10K 11/02; H01S 5/0683; H01S 5/06825; H01S 5/22; G11B 7/126; B82Y 20/00; C03B 33/0222
   (Continued)

(56) References Cited

U.S. PATENT DOCUMENTS

| 2,436,662 A | 2/1948 | Norgaard |
| 3,459,960 A | 8/1969 | Aaland et al. |

(Continued)

FOREIGN PATENT DOCUMENTS

| CN | 1386606 A  | 12/2002 |
| CN | 101767283 A | 7/2010 |

(Continued)

OTHER PUBLICATIONS

Hiroyuki Daido, et al, Review of laser-driven ion sources and their applications, published Apr. 17, 2012, Report On Progress in Physics, 75 (2012) 056401 (71 pp), IOP Publishing, doi: 10.1088/0034-4885/75/5/056401.*

(Continued)

*Primary Examiner* — Ibrahime A Abraham
*Assistant Examiner* — Gyounghyun Bae
(74) *Attorney, Agent, or Firm* — Morrison & Foerster LLP

(57) ABSTRACT

Systems and methods for material singulation. According to some embodiments, methods for material singulation may include applying a first laser output to the material, the first laser output causing a modification of a material property of the material when exposed to the first laser output; and applying a second laser output to the material that was exposed to the first laser output to cause singulation of the material in such a way that surfaces created by the singulation of the material are substantially free from defects.

14 Claims, 6 Drawing Sheets

(51) Int. Cl.
  *B23K 26/16* (2006.01)
  *B23K 26/38* (2014.01)
  *B23K 26/359* (2014.01)
  *C03B 33/02* (2006.01)
  *B23K 26/364* (2014.01)
  *B23K 26/40* (2014.01)
  *B23K 101/40* (2006.01)
  *B23K 103/00* (2006.01)

(52) U.S. Cl.
  CPC ............ B23K 26/364 (2015.10); B23K 26/40 (2013.01); C03B 33/0222 (2013.01); *B23K 2101/40* (2018.08); *B23K 2103/42* (2018.08); *B23K 2103/50* (2018.08); *B23K 2103/52* (2018.08); *B23K 2103/56* (2018.08); *Y02P 40/57* (2015.11)

(58) Field of Classification Search
  USPC ............ 219/121.67, 121.68, 121.69, 121.72, 219/121.77, 121.76, 121.71; 438/463, 438/795
  See application file for complete search history.

(56) References Cited

U.S. PATENT DOCUMENTS

| | | | |
|---|---|---|---|
| 3,599,019 A | 8/1971 | Nannichi et al. | |
| 3,602,836 A | 8/1971 | Young | |
| 3,604,890 A * | 9/1971 | Mullaney et al. | 219/121.67 |
| 3,626,318 A | 12/1971 | Young | |
| 3,646,469 A | 2/1972 | Buczek et al. | |
| 3,654,624 A | 4/1972 | Becker et al. | |
| 3,710,798 A * | 1/1973 | Bredemeier | A61B 18/20 |
| | | | 219/121.6 |
| 3,764,641 A | 10/1973 | Ash | |
| 3,806,829 A | 4/1974 | Duston et al. | |
| 3,851,267 A | 11/1974 | Tanner | |
| 3,928,816 A * | 12/1975 | Hartwick et al. | 372/4 |
| 3,963,953 A | 6/1976 | Thornton, Jr. | |
| 4,061,427 A | 12/1977 | Fletcher et al. | |
| 4,194,813 A | 3/1980 | Benjamin et al. | |
| 4,289,378 A | 9/1981 | Remy et al. | |
| 4,319,119 A | 3/1982 | Runge | |
| 4,449,215 A | 5/1984 | Reno | |
| 4,590,598 A | 5/1986 | O'Harra, II | |
| 4,718,418 A | 1/1988 | L'Esperance, Jr. | |
| 4,730,113 A | 3/1988 | Edwards et al. | |
| 4,743,769 A | 5/1988 | Schwaiger et al. | |
| 4,789,770 A * | 12/1988 | Kasner et al. | 219/121.7 |
| 4,808,000 A | 2/1989 | Pasciak | |
| 4,815,079 A | 3/1989 | Snitzer et al. | |
| 4,827,125 A | 5/1989 | Goldstein | |
| 4,835,670 A | 5/1989 | Adams et al. | |
| 4,847,846 A | 7/1989 | Sone et al. | |
| 4,848,340 A | 7/1989 | Bille et al. | |
| 4,856,011 A | 8/1989 | Shimada et al. | |
| 4,877,939 A * | 10/1989 | Duley et al. | 219/121.76 |
| 4,878,127 A | 10/1989 | Zollman et al. | |
| 4,902,127 A | 2/1990 | Byer et al. | |
| 4,907,586 A | 3/1990 | Bille et al. | |
| 4,915,757 A | 4/1990 | Rando | |
| 4,947,398 A | 8/1990 | Yasuda et al. | |
| 4,950,268 A | 8/1990 | Rink | |
| 4,983,034 A | 1/1991 | Spillman, Jr. | |
| 4,985,780 A * | 1/1991 | Garnier et al. | 219/121.68 |
| 4,994,059 A | 2/1991 | Kosa et al. | |
| 5,010,555 A | 4/1991 | Madey et al. | |
| 5,014,290 A | 5/1991 | Moore et al. | |
| 5,022,042 A | 6/1991 | Bradley | |
| 5,031,236 A | 7/1991 | Hodgkinson et al. | |
| 5,043,991 A | 8/1991 | Bradley | |
| 5,098,426 A | 3/1992 | Sklar et al. | |
| 5,154,707 A | 10/1992 | Rink et al. | |
| 5,159,402 A | 10/1992 | Ortiz, Jr. | |
| 5,162,643 A | 11/1992 | Currie | |
| 5,194,713 A * | 3/1993 | Egitto et al. | 219/121.71 |
| 5,204,517 A | 4/1993 | Cates et al. | |
| 5,204,867 A | 4/1993 | Koschmann | |
| 5,206,455 A | 4/1993 | Williams et al. | |
| 5,255,117 A | 10/1993 | Cushman | |
| 5,265,107 A | 11/1993 | Delfyett, Jr. | |
| 5,301,347 A | 4/1994 | Kensky | |
| 5,302,835 A | 4/1994 | Bendett et al. | |
| 5,309,453 A | 5/1994 | Treacy | |
| 5,315,436 A | 5/1994 | Lowenhar et al. | |
| 5,355,383 A | 10/1994 | Lockard | |
| 5,418,809 A | 5/1995 | August, Jr. et al. | |
| 5,428,471 A | 6/1995 | McDermott | |
| 5,440,573 A | 8/1995 | Fermann | |
| 5,479,422 A | 12/1995 | Fermann et al. | |
| 5,493,096 A | 2/1996 | Koh | |
| 5,493,579 A | 2/1996 | Ressl et al. | |
| 5,509,022 A * | 4/1996 | Lowery | H01S 5/065 |
| | | | 372/18 |
| 5,517,043 A | 5/1996 | Ma et al. | |
| 5,533,139 A | 7/1996 | Parker et al. | |
| 5,543,365 A * | 8/1996 | Wills et al. | 438/462 |
| 5,548,098 A | 8/1996 | Sugawara et al. | |
| 5,572,335 A | 11/1996 | Stevens | |
| 5,572,358 A | 11/1996 | Gabl et al. | |
| 5,585,642 A | 12/1996 | Britton et al. | |
| 5,585,652 A | 12/1996 | Kamasz et al. | |
| 5,585,913 A | 12/1996 | Hariharan et al. | |
| 5,590,142 A | 12/1996 | Shan | |
| 5,592,327 A | 1/1997 | Gabl et al. | |
| 5,595,668 A | 1/1997 | Madden et al. | |
| 5,624,587 A | 4/1997 | Otsuki et al. | |
| 5,625,544 A | 4/1997 | Kowshik et al. | |
| 5,633,750 A | 5/1997 | Nogiwa et al. | |
| 5,633,885 A | 5/1997 | Galvanauskas et al. | |
| 5,651,018 A | 7/1997 | Mehuys et al. | |
| 5,656,186 A | 8/1997 | Mourou et al. | |
| 5,663,731 A | 9/1997 | Theodoras, II et al. | |
| 5,665,942 A | 9/1997 | Williams et al. | |
| 5,670,067 A | 9/1997 | Koide et al. | |
| 5,677,769 A | 10/1997 | Bendett | |
| 5,689,519 A | 11/1997 | Fermann et al. | |
| 5,696,782 A | 12/1997 | Harter et al. | |
| 5,703,639 A | 12/1997 | Farrier et al. | |
| 5,710,424 A | 1/1998 | Theodoras, II et al. | |
| 5,720,894 A | 2/1998 | Neev et al. | |
| 5,739,933 A | 4/1998 | Dembeck et al. | |
| 5,770,864 A | 6/1998 | Dlugos | |
| 5,771,253 A | 6/1998 | Chang-Hasnain et al. | |
| 5,778,016 A | 7/1998 | Sucha et al. | |
| 5,786,117 A | 7/1998 | Hoshi et al. | |
| 5,788,688 A | 8/1998 | Bauer et al. | |
| 5,790,574 A | 8/1998 | Rieger et al. | |
| 5,815,519 A | 9/1998 | Aoshima et al. | |
| 5,833,759 A | 11/1998 | Haslow et al. | |
| 5,841,099 A | 11/1998 | Owen et al. | |
| 5,862,845 A | 1/1999 | Chin et al. | |
| 5,875,408 A | 2/1999 | Bendett et al. | |
| 5,880,823 A | 3/1999 | Lu | |
| 5,898,485 A | 4/1999 | Nati, Jr. | |
| 5,903,662 A | 5/1999 | DeCarlo | |
| 5,907,157 A | 5/1999 | Yoshioka et al. | |
| 5,929,430 A | 7/1999 | Yao et al. | |
| 5,936,716 A | 8/1999 | Pinsukanjana et al. | |
| 5,977,514 A * | 11/1999 | Feng | B41M 5/267 |
| | | | 219/121.69 |
| 5,994,667 A | 11/1999 | Merdan et al. | |
| 5,998,759 A * | 12/1999 | Smart | 219/121.69 |
| 6,034,975 A | 3/2000 | Harter et al. | |
| 6,041,020 A | 3/2000 | Caron et al. | |
| 6,049,057 A * | 4/2000 | Imai et al. | 219/121.7 |
| 6,060,684 A * | 5/2000 | Moriike | 219/121.75 |
| 6,061,373 A | 5/2000 | Brockman et al. | |
| 6,075,588 A | 6/2000 | Pinsukanjana et al. | |
| 6,099,522 A | 8/2000 | Knopp et al. | |
| 6,134,003 A | 10/2000 | Tearney et al. | |
| 6,156,030 A | 12/2000 | Neev | |
| 6,168,590 B1 | 1/2001 | Neev | |

(56) References Cited

U.S. PATENT DOCUMENTS

| | | | |
|---|---|---|---|
| 6,172,611 B1 | 1/2001 | Hussain et al. |
| 6,179,421 B1 | 1/2001 | Pang |
| 6,181,463 B1 | 1/2001 | Galvanauskas et al. |
| 6,191,382 B1* | 2/2001 | Damikolas | 219/121.62 |
| 6,198,568 B1 | 3/2001 | Galvanauskas et al. |
| 6,208,458 B1 | 3/2001 | Galvanauskas et al. |
| 6,208,673 B1* | 3/2001 | Miyake | 372/22 |
| 6,211,485 B1 | 4/2001 | Burgess |
| 6,228,748 B1 | 5/2001 | Anderson et al. |
| 6,246,816 B1 | 6/2001 | Moore et al. |
| 6,249,630 B1 | 6/2001 | Stock et al. |
| 6,256,328 B1 | 7/2001 | Delfyett et al. |
| 6,271,650 B1 | 8/2001 | Massie et al. |
| 6,275,250 B1 | 8/2001 | Sanders et al. |
| 6,290,910 B1 | 9/2001 | Chalk |
| 6,303,903 B1 | 10/2001 | Liu |
| 6,314,115 B1 | 11/2001 | Delfyett et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 | 3/2002 | Housand et al. |
| 6,366,395 B1 | 4/2002 | Drake et al. |
| 6,370,171 B1 | 4/2002 | Horn et al. |
| 6,371,469 B1 | 4/2002 | Gray |
| 6,396,317 B1 | 5/2002 | Roller et al. |
| 6,407,363 B2 | 6/2002 | Dunsky et al. |
| 6,418,154 B1 | 7/2002 | Kneip et al. |
| 6,425,912 B1 | 7/2002 | Knowlton |
| 6,433,301 B1 | 8/2002 | Dunsky et al. |
| 6,433,760 B1 | 8/2002 | Vaissie et al. |
| 6,437,283 B1* | 8/2002 | Wiggermann et al. | 219/121.7 |
| 6,455,807 B1* | 9/2002 | Scott | B23K 26/384 |
| | | | 219/121.62 |
| 6,463,314 B1 | 10/2002 | Haruna |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 | 2/2003 | Vogler et al. |
| 6,529,319 B2 | 3/2003 | Youn et al. |
| 6,541,731 B2* | 4/2003 | Mead et al. | 219/121.7 |
| 6,547,453 B1 | 4/2003 | Stummer et al. |
| 6,549,547 B2 | 4/2003 | Galvanauskas et al. |
| 6,555,781 B2 | 4/2003 | Ngoi et al. |
| 6,562,698 B2* | 5/2003 | Manor | B23K 26/0604 |
| | | | 257/E21.599 |
| 6,570,704 B2 | 5/2003 | Palese |
| 6,574,024 B1 | 6/2003 | Liu |
| 6,576,917 B1 | 6/2003 | Silfvast |
| 6,580,553 B2 | 6/2003 | Kim et al. |
| 6,583,381 B1 | 6/2003 | Duignan |
| 6,592,574 B1 | 7/2003 | Shimmick et al. |
| 6,593,753 B2 | 7/2003 | Scott et al. |
| 6,608,951 B1 | 8/2003 | Goldberg et al. |
| 6,614,565 B1 | 9/2003 | Klug et al. |
| 6,621,040 B1* | 9/2003 | Perry et al. | 219/121.67 |
| 6,621,045 B1 | 9/2003 | Liu et al. |
| 6,653,210 B2* | 11/2003 | Choo | B28D 1/221 |
| | | | 219/121.67 |
| 6,654,161 B2 | 11/2003 | Bass et al. |
| 6,661,568 B2 | 12/2003 | Hollemann et al. |
| 6,661,820 B1 | 12/2003 | Camilleri et al. |
| 6,681,079 B1 | 1/2004 | Maroney |
| 6,690,686 B2 | 2/2004 | Delfyett et al. |
| 6,696,008 B2 | 2/2004 | Brandinger |
| 6,697,402 B2 | 2/2004 | Crawford |
| 6,697,408 B2 | 2/2004 | Kennedy et al. |
| 6,700,094 B1 | 3/2004 | Kuntze |
| 6,706,036 B2 | 3/2004 | Lai |
| 6,706,998 B2 | 3/2004 | Cutler |
| 6,728,273 B2 | 4/2004 | Perry |
| 6,728,439 B2 | 4/2004 | Weisberg et al. |
| 6,735,229 B1 | 5/2004 | Delfyett et al. |
| 6,738,144 B1 | 5/2004 | Dogariu |
| 6,738,408 B2 | 5/2004 | Abedin |
| 6,744,009 B1 | 6/2004 | Xuan et al. |
| 6,744,552 B2 | 6/2004 | Scalora et al. |
| 6,744,555 B2 | 6/2004 | Galvanauskas et al. |
| 6,774,869 B2 | 8/2004 | Biocca et al. |
| 6,782,207 B1 | 8/2004 | Efimov |
| 6,787,732 B1* | 9/2004 | Xuan | B23K 26/0057 |
| | | | 219/121.67 |
| 6,787,733 B2* | 9/2004 | Lubatschowski et al. | |
| | | | 219/121.67 |
| 6,787,734 B2 | 9/2004 | Liu |
| 6,801,551 B1 | 10/2004 | Delfyett et al. |
| 6,804,574 B2 | 10/2004 | Liu et al. |
| 6,807,375 B2 | 10/2004 | Dogariu |
| 6,815,638 B2 | 11/2004 | Liu |
| 6,819,694 B2 | 11/2004 | Jiang et al. |
| 6,819,837 B2 | 11/2004 | Li et al. |
| 6,822,187 B1 | 11/2004 | Hermann et al. |
| 6,829,517 B2 | 12/2004 | Cheng et al. |
| 6,834,134 B2 | 12/2004 | Brennan, III et al. |
| 6,836,703 B2 | 12/2004 | Wang et al. |
| 6,838,639 B2* | 1/2005 | Kreuter et al. | 219/121.76 |
| 6,864,459 B2* | 3/2005 | Chang et al. | 219/121.71 |
| 6,878,900 B2 | 4/2005 | Corkum et al. |
| 6,887,804 B2 | 5/2005 | Sun et al. |
| 6,897,405 B2 | 5/2005 | Cheng et al. |
| 6,915,040 B2 | 7/2005 | Willner et al. |
| 6,917,631 B2 | 7/2005 | Richardson et al. |
| 6,928,490 B1 | 8/2005 | Bucholz et al. |
| 6,994,703 B2 | 2/2006 | Wang et al. |
| 7,001,373 B2 | 2/2006 | Clapham et al. |
| 7,002,733 B2 | 2/2006 | Dagenais et al. |
| 7,068,408 B2 | 6/2006 | Sakai |
| 7,078,649 B2* | 7/2006 | Okumura | 219/121.69 |
| 7,097,640 B2 | 8/2006 | Wang et al. |
| 7,116,688 B2 | 10/2006 | Sauter et al. |
| 7,143,769 B2 | 12/2006 | Stoltz et al. |
| 7,157,038 B2* | 1/2007 | Baird et al. | 264/400 |
| 7,169,687 B2* | 1/2007 | Li | B23K 26/0622 |
| | | | 438/463 |
| 7,217,266 B2 | 5/2007 | Anderson et al. |
| 7,220,255 B2 | 5/2007 | Lai |
| 7,332,234 B2 | 2/2008 | Levinson et al. |
| 7,349,589 B2 | 3/2008 | Temelkuran et al. |
| 7,367,969 B2 | 5/2008 | Stoltz et al. |
| 7,413,565 B2 | 8/2008 | Wang et al. |
| 7,414,780 B2 | 8/2008 | Fermann et al. |
| 7,505,196 B2 | 3/2009 | Nati et al. |
| 7,569,794 B2* | 8/2009 | Faour et al. | 219/121.68 |
| 7,674,719 B2 | 3/2010 | Li et al. |
| 7,675,674 B2 | 3/2010 | Bullington et al. |
| 7,728,967 B2 | 6/2010 | Ochiai et al. |
| 7,751,118 B1 | 7/2010 | Di Teodoro et al. |
| 7,759,607 B2 | 7/2010 | Chism, II |
| 7,773,216 B2 | 8/2010 | Cheng et al. |
| 7,792,408 B2 | 9/2010 | Varming |
| 7,822,347 B1 | 10/2010 | Brennan, III et al. |
| 7,847,213 B1* | 12/2010 | Anikitchev | 219/121.61 |
| 7,943,533 B2* | 5/2011 | Mizuno | 438/795 |
| 7,963,958 B2 | 6/2011 | Stoltz et al. |
| 7,998,404 B2 | 8/2011 | Huang et al. |
| RE43,605 E | 8/2012 | O'Brien et al. |
| 8,338,746 B2* | 12/2012 | Sun et al. | 219/121.72 |
| 8,373,090 B2 | 2/2013 | Gale et al. |
| 8,943,855 B2* | 2/2015 | Gomez | C03B 33/0222 |
| | | | 65/105 |
| 8,946,590 B2* | 2/2015 | Li | C03B 33/091 |
| | | | 219/121.67 |
| 2001/0009250 A1* | 7/2001 | Herman et al. | 219/121.69 |
| 2001/0021294 A1 | 9/2001 | Cai et al. |
| 2001/0046243 A1 | 11/2001 | Schie |
| 2002/0071454 A1 | 6/2002 | Lin |
| 2002/0091325 A1 | 7/2002 | Ostrovsky |
| 2002/0097468 A1 | 7/2002 | Mecherle et al. |
| 2002/0097761 A1 | 7/2002 | Sucha et al. |
| 2002/0115273 A1 | 8/2002 | Chandra et al. |

(56) References Cited

U.S. PATENT DOCUMENTS

| | | |
|---|---|---|
| 2002/0118934 A1 | 8/2002 | Danziger et al. |
| 2002/0153500 A1 | 10/2002 | Fordahl et al. |
| 2002/0162973 A1* | 11/2002 | Cordingley et al. ....... 250/492.2 |
| 2002/0167581 A1 | 11/2002 | Cordingley et al. |
| 2002/0167974 A1 | 11/2002 | Kennedy et al. |
| 2002/0170896 A1 | 11/2002 | Choo et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0122550 A1 | 7/2003 | Kanamaru et al. |
| 2003/0123496 A1 | 7/2003 | Broutin et al. |
| 2003/0129423 A1 | 7/2003 | Mastromatteo et al. |
| 2003/0142705 A1 | 7/2003 | Hackel et al. |
| 2003/0152115 A1 | 8/2003 | Jiang et al. |
| 2003/0156605 A1 | 8/2003 | Richardson et al. |
| 2003/0160034 A1* | 8/2003 | Filgas ................ B23K 26/0648 219/121.68 |
| 2003/0178396 A1 | 9/2003 | Naumov et al. |
| 2003/0189959 A1 | 10/2003 | Erbert et al. |
| 2003/0205561 A1 | 11/2003 | Iso |
| 2003/0219094 A1* | 11/2003 | Basting ............... G03F 7/70025 378/34 |
| 2003/0223689 A1 | 12/2003 | Koch et al. |
| 2003/0235381 A1 | 12/2003 | Hunt |
| 2004/0002199 A1* | 1/2004 | Fukuyo .............. B23K 26/0057 438/460 |
| 2004/0022695 A1 | 2/2004 | Simon et al. |
| 2004/0042061 A1 | 3/2004 | Islam et al. |
| 2004/0049552 A1 | 3/2004 | Motoyama et al. |
| 2004/0089644 A1* | 5/2004 | Sekiya ................. H01L 21/78 219/121.72 |
| 2004/0101001 A1 | 5/2004 | Bergmann et al. |
| 2004/0108811 A1 | 6/2004 | Klausmann et al. |
| 2004/0128081 A1 | 7/2004 | Rabitz et al. |
| 2004/0134894 A1 | 7/2004 | Gu et al. |
| 2004/0160995 A1 | 8/2004 | Sauter et al. |
| 2004/0226922 A1 | 11/2004 | Flanagan |
| 2004/0226925 A1 | 11/2004 | Gu et al. |
| 2004/0263950 A1 | 12/2004 | Fermann et al. |
| 2005/0021243 A1 | 1/2005 | Dantus et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0065502 A1 | 3/2005 | Stoltz |
| 2005/0077275 A1 | 4/2005 | Stoltz |
| 2005/0111073 A1 | 5/2005 | Pan et al. |
| 2005/0122525 A1* | 6/2005 | Borden et al. ................ 356/445 |
| 2005/0150882 A1* | 7/2005 | Mori ................... B23K 26/128 219/121.84 |
| 2005/0154380 A1 | 7/2005 | DeBenedictis et al. |
| 2005/0163426 A1 | 7/2005 | Fermann et al. |
| 2005/0171518 A1 | 8/2005 | Stoltz et al. |
| 2005/0177143 A1 | 8/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226286 A1 | 10/2005 | Liu et al. |
| 2005/0226287 A1 | 10/2005 | Shah et al. |
| 2005/0253482 A1 | 11/2005 | Kapps et al. |
| 2005/0255715 A1 | 11/2005 | Cheng et al. |
| 2005/0265407 A1 | 12/2005 | Braun et al. |
| 2005/0271094 A1 | 12/2005 | Miller et al. |
| 2005/0274702 A1 | 12/2005 | Deshi |
| 2006/0016891 A1 | 1/2006 | Giebel et al. |
| 2006/0030951 A1 | 2/2006 | Davlin et al. |
| 2006/0056480 A1 | 3/2006 | Mielke et al. |
| 2006/0067604 A1 | 3/2006 | Bull et al. |
| 2006/0081101 A1 | 4/2006 | Hayashi et al. |
| 2006/0084957 A1 | 4/2006 | Delfyett et al. |
| 2006/0091125 A1* | 5/2006 | Li et al. ................... 219/121.69 |
| 2006/0093265 A1 | 5/2006 | Jia et al. |
| 2006/0096426 A1 | 5/2006 | Park |
| 2006/0096962 A1 | 5/2006 | Park |
| 2006/0131284 A1* | 6/2006 | Sun ........................ B23K 26/04 219/121.69 |
| 2006/0131288 A1 | 6/2006 | Sun et al. |
| 2006/0159137 A1 | 7/2006 | Shah |
| 2006/0187974 A1 | 8/2006 | Dantus |
| 2006/0201983 A1* | 9/2006 | Kusama et al. ................... 225/2 |
| 2006/0237397 A1* | 10/2006 | Yamazaki et al. ......... 219/121.6 |
| 2006/0249816 A1 | 11/2006 | Li et al. |
| 2006/0250025 A1 | 11/2006 | Kitagawa et al. |
| 2006/0268949 A1 | 11/2006 | Gohle et al. |
| 2007/0047965 A1 | 3/2007 | Liu et al. |
| 2007/0051706 A1* | 3/2007 | Bovatsek ........... B23K 26/0617 219/121.69 |
| 2007/0098025 A1 | 5/2007 | Hong et al. |
| 2007/0106416 A1 | 5/2007 | Griffiths et al. |
| 2007/0151961 A1 | 7/2007 | Kleine et al. |
| 2007/0166965 A1 | 7/2007 | Tanaka et al. |
| 2007/0199927 A1* | 8/2007 | Gu ........................ B23K 26/04 219/121.69 |
| 2007/0215581 A1 | 9/2007 | Kato et al. |
| 2007/0229939 A1 | 10/2007 | Brown et al. |
| 2007/0253455 A1 | 11/2007 | Stadler et al. |
| 2008/0029152 A1* | 2/2008 | Milshtein et al. ............. 136/252 |
| 2008/0050078 A1 | 2/2008 | Digonnet et al. |
| 2008/0050888 A1 | 2/2008 | Garner et al. |
| 2008/0058781 A1 | 3/2008 | Langeweyde et al. |
| 2008/0240184 A1 | 10/2008 | Cho et al. |
| 2008/0264910 A1* | 10/2008 | Kashyap et al. ......... 219/121.61 |
| 2009/0020511 A1 | 1/2009 | Kommera et al. |
| 2009/0045176 A1 | 2/2009 | Wawers et al. |
| 2009/0061724 A1 | 3/2009 | Cok et al. |
| 2009/0189159 A1 | 7/2009 | Enicks et al. |
| 2009/0223942 A1* | 9/2009 | Heyl .................... H01L 21/4821 219/121.69 |
| 2009/0242522 A1* | 10/2009 | Baird .................... B23K 26/03 219/121.61 |
| 2009/0244695 A1 | 10/2009 | Marcinkevicius et al. |
| 2009/0245302 A1 | 10/2009 | Baird et al. |
| 2009/0257464 A1* | 10/2009 | Dantus ..................... G01J 11/00 372/25 |
| 2009/0273828 A1 | 11/2009 | Waarts et al. |
| 2009/0290151 A1 | 11/2009 | Agrawal et al. |
| 2009/0297155 A1 | 12/2009 | Weiner et al. |
| 2009/0314751 A1* | 12/2009 | Manens .......... H01L 31/022425 219/121.69 |
| 2010/0013036 A1 | 1/2010 | Carey |
| 2010/0025387 A1* | 2/2010 | Arai .................... B23K 26/0635 219/121.69 |
| 2010/0032416 A1* | 2/2010 | Jeong et al. ............. 219/121.61 |
| 2010/0040095 A1 | 2/2010 | Mielke et al. |
| 2010/0072183 A1 | 3/2010 | Park |
| 2010/0089882 A1* | 4/2010 | Tamura ............. B23K 26/0608 219/121.69 |
| 2010/0118899 A1 | 5/2010 | Peng et al. |
| 2010/0154549 A1* | 6/2010 | Fomitchov ..................... 73/643 |
| 2010/0157418 A1 | 6/2010 | Dong et al. |
| 2010/0181284 A1 | 7/2010 | Lee et al. |
| 2010/0276405 A1* | 11/2010 | Cho et al. ................. 219/121.72 |
| 2010/0294745 A1* | 11/2010 | Cattaneo ................. 219/121.68 |
| 2011/0049765 A1 | 3/2011 | Li et al. |
| 2011/0069723 A1 | 3/2011 | Dong et al. |
| 2011/0100967 A1 | 5/2011 | Yoo et al. |
| 2011/0207328 A1* | 8/2011 | Speakman ..................... 438/694 |
| 2011/0284510 A1 | 11/2011 | Reeves-Hall et al. |
| 2011/0287607 A1 | 11/2011 | Osako et al. |
| 2012/0000893 A1 | 1/2012 | Broude et al. |
| 2012/0037603 A1* | 2/2012 | Venturini ........... B23K 26/0081 219/121.66 |
| 2012/0152915 A1 | 6/2012 | Srinivas et al. |
| 2012/0156875 A1 | 6/2012 | Srinivas et al. |
| 2012/0160814 A1* | 6/2012 | Osako ................. B23K 26/364 219/121.61 |

(56) References Cited

U.S. PATENT DOCUMENTS

| | | |
|---|---|---|
| 2014/0044139 A1 | 2/2014 | Dong et al. |
| 2014/0140361 A1 | 5/2014 | Jiang |

FOREIGN PATENT DOCUMENTS

| | | | |
|---|---|---|---|
| DE | WO2007000194 A1 | 4/2007 | |
| EP | 0214100 | 3/1987 | |
| EP | 554398 A1 | 6/1993 | |
| EP | 0691563 | 1/1996 | |
| EP | 1462831 | 9/2004 | |
| GB | 2331038 A | 12/1999 | |
| JP | 405104276 A | 4/1993 | |
| JP | 8171103 | 7/1996 | |
| JP | 11189472 | 7/1999 | |
| JP | 2002-346782 A | 12/2002 | |
| JP | 2003181661 | 7/2003 | |
| JP | 2003344883 | 12/2003 | |
| JP | 2004066322 A | 3/2004 | |
| JP | 2005174993 | 6/2005 | |
| JP | 2005-178288 A | 7/2005 | |
| JP | 2006-35710 A | 2/2006 | |
| JP | 2006263771 A | 10/2006 | |
| KR | 10-2001-0027677 | * | 11/2002 |
| WO | WO9428972 | 12/1994 | |
| WO | 0229853 A2 | 4/2002 | |
| WO | WO2004105100 | 12/2004 | |
| WO | WO2004114473 | 12/2004 | |
| WO | WO2005018060 | 2/2005 | |
| WO | WO2005018061 | 2/2005 | |
| WO | WO2005018062 | 2/2005 | |
| WO | WO2005018063 | 2/2005 | |
| WO | WO2007034317 | 3/2007 | |

OTHER PUBLICATIONS

Agostinelli, J. et al., "Optical Pulse Shaping with a Grating Pair," Applied Optics, vol. 18, No. 14, pp. 2500-2504, Jul. 15, 1979.

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers," Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol. 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J.R., et al., "Broadband Single-polarization Photonic Crystal Fiber," Optics Letters, vol. 30, No. 12, Jun. 15, 2005, pp. 1446-1448.

Folkenberg, J.R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.

Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-777-6.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

Ibanescu et al., "Analysis of Mode Structure in Hollow Dielctric Waveguide Fibers," Physical Review E 67, 2003, The American Physical Society.

Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.

Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, Kai-Hsiu et al., "Large-aperture Chirped Volume Bragg Grating Based Fiber CPA System," Optics Express, Apr. 16, 2007, vol. 15, No. 8, pp. 4876-4882.

(56) References Cited

OTHER PUBLICATIONS

Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Lo, S. et al., "Semiconductor Hollow Optical Waveguides Formed by Omni-directional Reflectors", Optics Express, vol. 12, No. 26, Dec. 27, 2004, pp. 6589-6593.
Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.
Mehier-Humbert, S. et al., "Physical Methods for Gene Transfer: Improving the Kinetics of Gene Delivery Into Cells," Advanced Drug Delivery Reviews, vol. 57, pp. 733-753, 2005.
Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.
Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.
Nicholson, J. et al., "Propagation of Femotsecond Pulses in Large-mode-area, Higher-order-mode Fiber," Optics Letters, vol. 31, No. 21, 2005, pp. 3191-3193.
Nishimura et al., "In Vivo Manipulation of Biological Systems with Femtosecond Laser Pulses," Proc. SPIE 6261, 62611J, pp. 1-10, 2006.
Noda, J. et al., "Polarization-maintaining Fibers and Their Applications", Journal of Lightwave Technology, vol. Lt-4, No. 8 Aug. 1986, pp. 1071-1089.
Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.
Pelusi, M. et al., "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.
Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.
Price et al., "Advances in High Power, Short Pulse, Fiber Laser Systems and Technology", Photonics West 2005, San Jose, California, Jan. 2005, pp. 5709-3720.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Ramachandran, S., et al., "High-power Amplification in a 2040-µm2 Higher Order Mode," SPIE Photonics West 2007, Post-deadline.
Resan et al., "Dispersion-Managed Semiconductor Mode-Locked Ring Laser", Optics Letters, Aug. 1, 2003, pp. 1371-1373, vol. 28, No. 15, Optical Society of America.
Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.
Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.
Siegman, "Unstable Optical Resonators", Applied Optics, Feb. 1974, pp. 353-367, vol. 13, No. 2.
Stevenson et al., Femtosecond Optical Transfection of Cells: Viability and Efficiency, Optics Express, vol. 14, No. 16, pp. 7125-7133, Aug. 7, 2006.
Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.
Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on 1985-12-011.
Temelkuran, B. et al., "Wavelength-scalable Hollow Optical Fibres with Large Photonic Bandgaps for CO2 Laser Transmission," Nature, Dec. 12, 2002, pp. 650-653.
Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Tirlapur et al., "Targeted Transfection by Femtosecond Laser," Nature Publishing Group, vol. 418, pp. 290-291, Jul. 18, 2002.
Tsai et al., "Ultrashort Pulsed Laser Light," Optics & Photonics News, pp. 25-29, Jul. 2004.
Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.
Weiner, A.M. et al., "Synthesis of Phase-coherent, Picosecond Optical Square Pulses," Optics Letters, vol. 11, No. 3, pp. 153-155, Mar. 1986.
Weiner, A.M., "Femtosecond Optical Pulse Shaping and Processing," Prog. Quant. Electr. 1995, vol. 19, pp. 161-237, 1995.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55 µm Wavelength Region., 2005, Proceedings of SPIE vol. 5633, Advanced Materials and Devices for Sensing and Imaging II, pp. 424-429.
Yeh, et al. "Theory of Bragg Fiber", Journal of the Optical Society America, Sep. 1978, pp. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Office Action received for Japanese Patent Application No. 2014-531770, dated Jun. 30, 2015, 12 pages (6 pages of English Translation and 6 pages of Official copy).
Office Action received for Chinese Patent Application No. 201180073591.X, dated Dec. 2, 2015, 22 pages (12 pages of English Translation and 10 pages of Official copy).
International Preliminary Report on Patentability received for PCT Patent Application No. PCT/US2011/052659, dated Apr. 3, 2014, 6 pages.
International Search Report and Written Opinion received for PCT Patent Application No. PCT/US2011/052659, dated Jan. 18, 2012, 7 pages.

\* cited by examiner

SYSTEMS AND PROCESSES THAT SINGULATE MATERIALS

FIELD OF THE TECHNOLOGY

The present technology relates generally to laser processing of materials, and more specifically, but not by way of limitation, to systems and methods that singulate materials.

BACKGROUND

Generally speaking, singulation is a material separation process that often involves the application of chemical processes and/or mechanical forces to materials, particularly brittle materials, such as strengthened glass. Other common examples of materials that are often processed to create products via singulation include, but are not limited to, amorphous solid materials, crystalline materials, semiconducting materials, a crystalline ceramics, polymers, resins, and so forth.

SUMMARY OF THE TECHNOLOGY

According to some embodiments, the present technology may be directed to methods for material singulation. The methods may include: (a) applying a first laser output to the material, the first laser output causing a modification of a material property of the material when exposed to the first laser output; and (b) applying a second laser output to the material that was exposed to the first laser output to cause singulation of the material while substantially reducing the impartation of defects into the material.

In other embodiments, the present technology may be directed to laser devices for causing material singulation. These laser devices may include: (a) a first laser device that generates laser output for modifying one or more material properties of a material when applied to at least a portion of the material; and (b) a second laser device that generates laser output that, when applied to the material exposed to the laser output of the first laser device, produces a singulated product while substantially reducing the impartation of defects into the product.

In additional embodiments, the present technology may be directed to singulated products created by a process. In some embodiments, the process may include: (a) providing a stock of material; (b) applying a first laser output to the stock material along a beam path, the first laser output causing a modification of a material property of the stock material along the beam path; and (c) applying a second laser output along the beam path to cause separation of the singulated material from the stock material, along the beam path in such a way that surfaces of the singulated material, created by the separation, are substantially free from defects.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
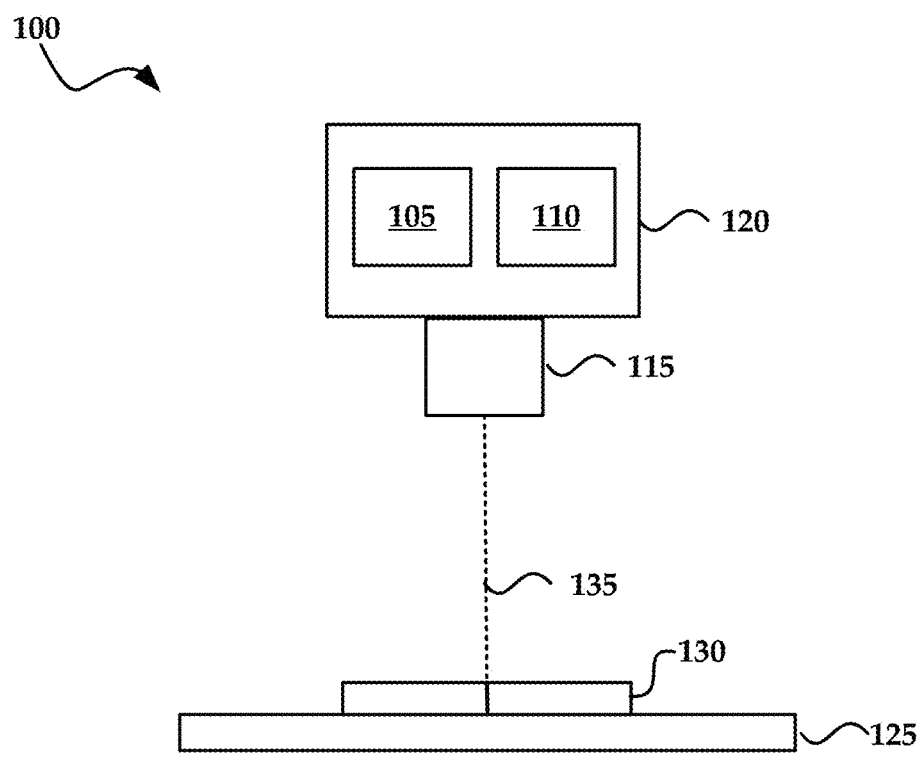
FIG. 1 is a schematic representation of an exemplary singulation system for use in accordance with the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology relates generally to laser processing of materials, and more specifically, but not by way of limitation, to systems and methods that singulate materials, particularly brittle materials, by applying two or more types of laser output to the material, wherein the resultant singulated product is substantially free from defects.

Singulation allows for the separation of the material into individual products, or the milling of features into the material. Common singulation processes often involve numerous processing steps that are conducted slowly and iteratively in an attempt to avoid introducing defects such as micro-cracks or chips into the final product. Even with multi-step processes, current processes have low yield rates as any application of mechanical forces to the material can easily impart defects into the material.

Therefore, what is needed is a simplified process for singulating materials that does not require the use of mechanical material separation devices and/or processes.

Generally speaking, the present technology may include synchronous exposure of a material to two or more different types of laser beam output where each type of laser beam output induces a different physical mechanism of change to the material. The combination of these exposures creates a product with a clean, defect-free shape. A product with a clean, defect-free shape may also be referred to as a product having surfaces that are "substantially smooth."

As stated above, common examples of materials that are often processed to create products via singulation include, but are not limited to, amorphous solid materials, crystalline materials, semiconducting materials, a crystalline ceramics, polymers, resins, and so forth.

For example, a sheet of strengthened glass may be subjected to two or more types of laser beam output to transform the sheet of strengthened glass into one or more touchscreen substrates that can be utilized to create touchscreen devices. Examples of strengthened glass may include glass that has been improved by high temperature exposure or by chemical treatment, such as Gorilla Glass from Corning or Dragontrail from Asahi. The sheet of strengthened glass may be especially thin—approximately 0.5 mm or thinner—which may impose increased susceptibility to defect impartation during conventional singulation methods.

Broadly speaking, the first laser output may induce a modification into the material and the second laser output may cause separation of the material at the modification. This two step process may create a singulated product having edge surfaces (as well as an overall product) that are substantially free from defects such as cracks or other surface irregularities/variations. That is, the present technology creates singulated products that have smoother singulated edges, more uniform planar surfaces, lower surface roughness, and greater mechanical strength relative to singulated products created via mechanical processes.

The present technology may be utilized to create singulated products with greatly varying geometrical configurations. Additionally, the systems and methods provided herein may be utilized to fabricate features into products with fine precision. Examples of features may include, but are not limited to slits, apertures, grooves, notches, etching, and so forth.

More specifically, a first laser beam may induce a discrete change to the molecular structure of the material along a beam path (also known as a tool path). The modification may comprise any of: a separation of molecular bonds in the material lattice, a geometrical reorientation of molecular constituents, and/or spatial movement of molecular species—just to name a few. Modifications may manifest macroscopically as a perturbation to a refractive index, an optical absorption, a variation in mechanical stress relative to the rest of the material, or a change in the physical density of the material.

In some embodiments, the second laser beam may follow the same path as the first laser beam and create a heating effect along the path that produces complete separation between sections of the substrate (along the modification) along the path traced by the laser beams. The two laser beams may be imaged onto the substrate with very little time delay. That is, there may be very little time delay between the delivery of the second beam after the delivery of the first beam (in some cases within a fraction of a second). Moreover, the two laser beams may be imaged using a single motion control and beam delivery apparatus. The exposure of the substrate to the two laser beams may occur substantially simultaneously so as to function as one laser beam with respect to time, yet the net material modification (e.g., singulation) is produced by the combined effects of two discrete laser induced mechanisms.

According to other exemplary embodiments, the present technology may utilize a short pulse laser to produce a first modification in the material and a long pulse or continuous wave laser to separate the material. The peak power associated with the short pulse laser may readily invoke any of the aforementioned molecular perturbations, while material exposed to the short pulse laser remains in a solid phase. It will be understood that these perturbation may be caused by rapid acceleration of electrons in response to application of the strong electric field of the short laser pulse to the material. The first modification may include any of a family of ionization effects, such as discontinuities in the lattice pattern (molecular level) of the material.

The second laser may generate a laser beam with a relatively high average power and low peak power. The laser beam may generate heat in the material through optical absorption. Localized heating within the second laser beam exposure area may selectively heat the modification created by the first laser beam and cause the material to separate along the lattice pattern discontinuity (e.g., the modification). Other causes for separation may include propagation of an acoustic shockwave (generated by the application of the laser beam of the second laser) through the area of material modification, and/or to severe thermal gradation of the area of material modification.

FIG. 1 illustrates an exemplary singulation system (hereinafter "system 100") for use in practicing embodiments of the present technology. Generally speaking, the system 100 may comprise a first laser device 105 and a second laser device 110 that are each selectively coupled with a beam delivery assembly 115. Each of the first and second laser devices will be discussed in greater detail infra. For the purposes of clarity, the first and second laser devices 105 and 110 are shown as being disposed within the same housing 120, although it will be understood that the first and second laser devices may be housed separately from one another, and optionally in separate systems (not shown).

The beam delivery assembly 115 may be generally described as comprising optical and/or structural components that are utilized to focus and direct laser beams generated by the first and second laser devices 105 and 110. The construction and operation of beam delivery assemblies would be well known to one of ordinary skill in the art with the present disclosure before them. Therefore, a detailed discussion of the beam delivery assembly 115 will be omitted for the purpose of brevity.

The system 100 may also include a platform 125 positioned below the first and second laser devices 105 and 110. The platform 125 may be utilized to support a material 130, also known as a stock material.

Figure 2A:
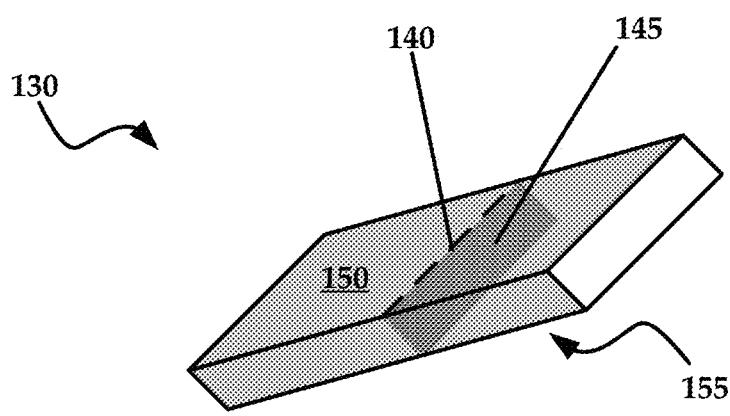
FIG. 2A is a perspective view of a material having a modification caused by application of a first laser output to the material.
Figure 2B:
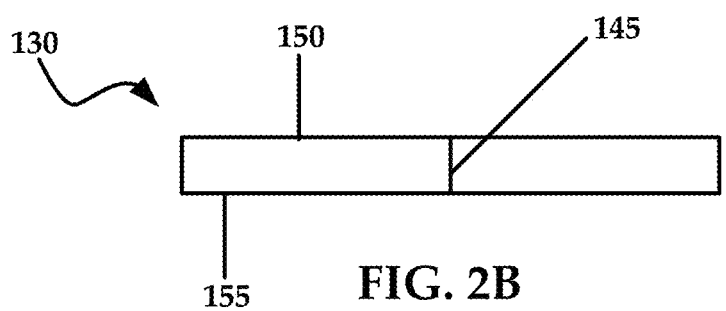
FIG. 2B is a side elevation view of the material showing the modification extending through the material, shown under microscopic evaluation.

Referring now to FIGS. 1-2B collectively, the first laser device 105 may include any one of a number of different types of lasers that is adapted to generate a laser beam 135 that induces a primarily electronic energy excitation within the material 130. It will be understood that the first laser device 105 may generate a laser beam that comprise a wavelength of light selected from any of visible, near infrared, or ultraviolet.

Additionally, the first laser device 105 may utilize a laser pulse duration of less than or equal to about ten nanoseconds. In other embodiments, the first laser device 105 utilizes a laser pulse duration of less than or equal to about fifty picoseconds. In some embodiments, the first laser device 105 may utilize a laser pulse duration of less than or equal to about one picosecond. The laser pulse duration of the first laser device 105 may be selected based a desired electric field strength that is to be generated within the irradiated area (desired area of modification). The laser pulse duration and laser pulse strength may be varied based upon the physical properties of the material such as density and opacity.

The first laser device 105 may selectively apply a laser beam to the material along a beam path 140, or according to a pattern. Selective adjustments of the beam delivery assembly 115 may cause electronic energy excitation to any depth of the material (see FIG. 3). Additionally, the amount of electronic energy excitation may be selectively adjusted by varying additional parameters of the first laser device 105 such as beam delivery speed and beam energy level.

The electronic energy excitation of the material may cause a perturbation of molecules within the material along the beam path 140. It will be understood that in general terms, perturbation of the material may include inducing a change in one or more physical properties of the material 130. A perturbation may include, for example, a separation of the molecular bonds in molecular lattice of the material (also known as creating a lattice pattern discontinuity), a localized volume of removed material (also known as a scribe), a geometrical reorientation of molecules of the material, and/or a change in material density along the beam path—just to name a few.

FIGS. 2A and 2B illustrate a modification 145 that extends between a top surface 150 and a bottom surface 155 of the material 130, along the length of the beam path 140.

Figure 3:
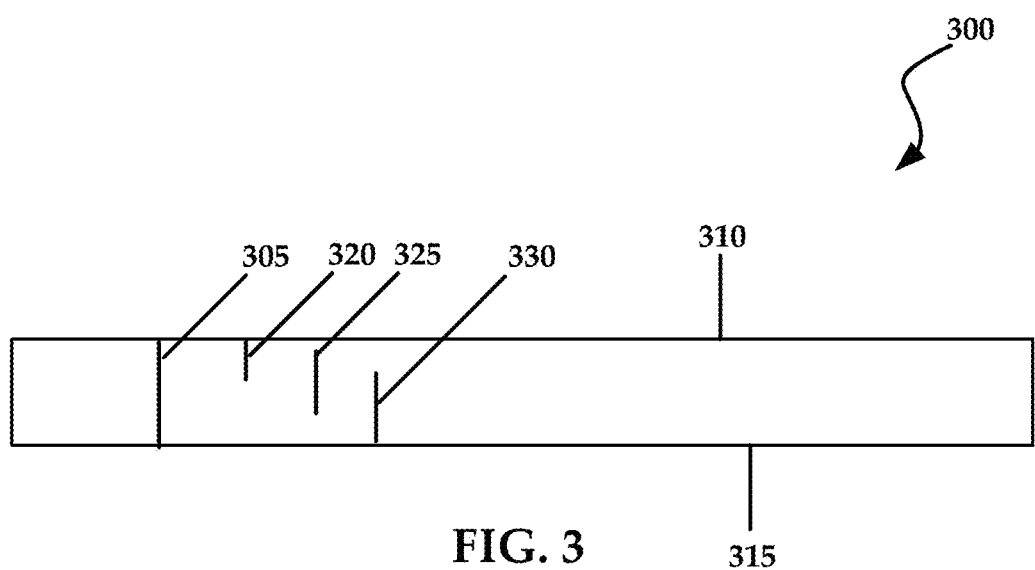
FIG. 3 is a side elevation view of a material showing varying modifications, each extending through a different depth within the material.

FIG. 3 illustrates material modifications of varying length and depth within a material 300. For example, a modification 305 may extend between a top surface 310 and a bottom surface 315 of the material 300 (similar to the modification 145 of FIGS. 2A and 2B). Modification 320 is shown as extending from the top surface 310 to a depth within the material 300. Modification 325 is shown as beginning at a distance below the top surface 310 and terminating at a predetermined distance above the bottom surface 315. Modification 330 is shown as extending upwardly from the bottom surface 315 of the material 300 and terminating within the material 300 at a predetermined distance from the top surface 310. These modifications are merely exemplary and illustrate that modifications may extend at any depth between the top surface 310 and the bottom surface 315 of the material 300.

Additionally, the width of the beam path 140 may be selectively adjusted by varying the optical configurations of the beam delivery assembly 115. According to some embodiments, the beam delivery assembly 115 may focus the output of the first laser device 105 to approximately 1 micrometer to 100 micrometers in width. One of ordinary skill in the art with the present disclosure before them will appreciate that the beam width may be selectively varied to vary the dimensions of the modification 305.

Modifications to material properties of the material may be evidenced by inspection of the mechanical properties of the material. For example, a modification may induce a change in the refractive index (particularly for transparent or semi-transparent materials) of the material along the modification. Therefore, upon refractive inspection of the material, the modification may appear visually distinct from the unmodified material.

Figure 4A:
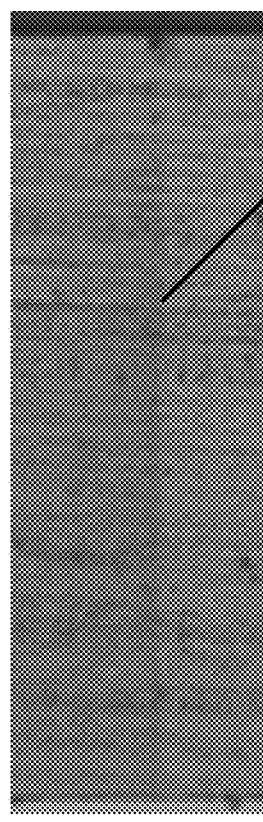
FIG. 4A is a microscopic photograph of a side elevation view showing modification of the material.
Figure 4B:
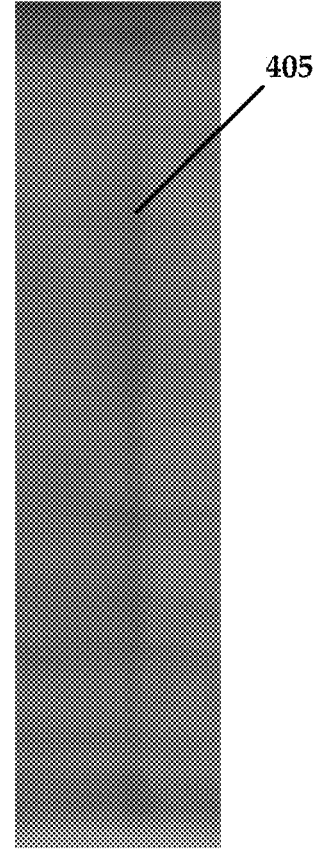
FIG. 4B is another microscopic photograph of the side elevation view of FIG. 4A, focused three millimeters into the material.

FIGS. 4A and 4B illustrate microscopic photographs of refractive inspection of a modified material 400. The material 400 has been exposed to a first laser output that induced a modification 405 within the material 400. It will be understood that the modification resulted in a change in the density of the material 400 along a beam path emitted by the first laser device. Inspection included application of light to the material. Upon application of light to the material, the modification 405 appears as a dark line that extends through the material 400. This darkening is due to the light traveling more slowly or with greater absorption through the modification 405 relative to the rest of the material 400 adjacent (on either side) the modification 405.

It is noteworthy to mention that FIG. 4B illustrates the same portion of the material 400 as FIG. 4A, with the exception that FIG. 4B is focused three millimeters into the material 400. Moreover, magnification and imaging of the material 400 is made possible because the material 400 is at least partially transparent and able to pass light therethrough.

Figure 5:
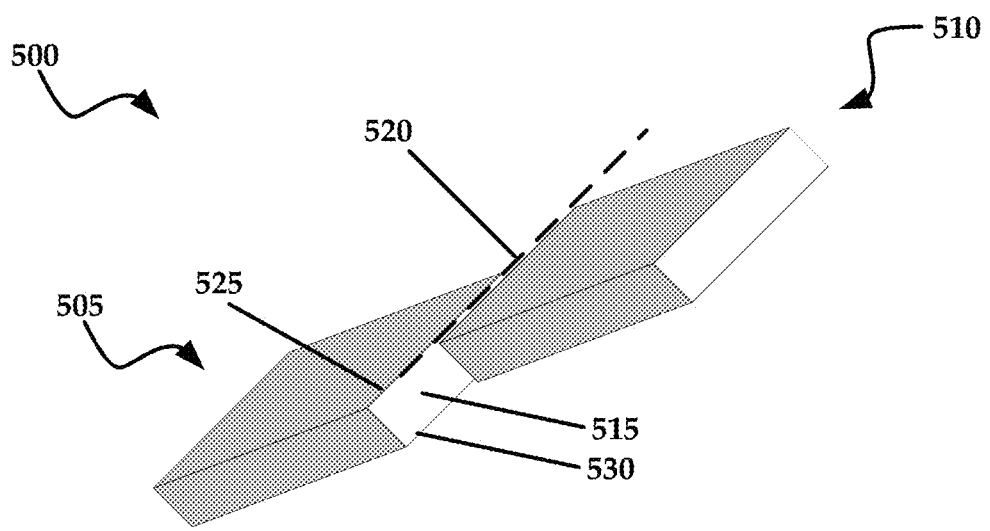
FIG. 5 is a perspective view of the material singulated into two sections by application of a second laser output to the modification.

FIG. 5 illustrates separation (e.g., singulation) of modified material 500 (shown in an already singulated configuration) into separate sections, such as a first section 505 and a second section 510. The first and second sections 505 and 510 are shown offset from one another for illustrative purposes only, to show an edge surface 515 of the first section 505. A modified material will be understood to include a material that has previously been subjected to a first laser output of a first laser device 105.

The singulation of the modified material 500 may be caused by laser output of the second laser device 110 along the beam path 520. It is noteworthy to mention that the beam path 520 is shown as extending past the edges of the modified material 500 for illustrative purposes only.

The laser output of the second laser device 110 may cause a heating of the modified material 500 along the beam path 520, which results in a separation or singulation of the modified material along the modification (represented by beam path 520). It will be understood that the separation of the modified material 500 by the second laser device 110 produces a singulated product that is substantially free from defects. For example, an edge surface such as singulated edge surface 515 and corners 525 and 530 that are created during singulation are substantially free from defects such as cracking, chipping or misshaping. These defects may degrade mechanical integrity, fracture strength, and/or cosmetic value of the product. Although not shown, the second section 510 also includes a singulated edge surface that is substantially free from defects.

Although not shown, the laser beam generated by the second laser device 110 may be of sufficient width to increase the temperature of the material directly adjacent to the modified material. The increase in temperature to adjacent material aids in preventing the development of defects along the beam path 520 during singulation.

Depending upon the type of laser utilized, the second output of the second laser device 110 may generate an acoustic shockwave that propagates through the modified material 500. This acoustic shockwave may cause failure of the modified material along the beam path 520. It will be understood that a shockwave may be generated by the output of an ultrafast laser device.

In other embodiments, the laser beam of the second laser device 110 may utilize laser pulse durations that are greater than or equal to about ten picoseconds. Other embodiments may include laser pulse durations of greater than or equal to about one microsecond.

In some embodiments, the second laser output may comprise a wavelength selected from a range of approximately 0.78 to three micrometers (i.e. the near infrared light spectrum), inclusive. In other embodiments, the second laser output may comprise a wavelength selected from a range of approximately three to fifty micrometers (i.e. the mid infrared light spectrum), inclusive. In other applications, the second laser output comprises a wavelength selected from a range of approximately fifty to one thousand micrometers (i.e. the far infrared light spectrum), inclusive. In yet other embodiments, the second laser device 110 includes a continuous wave laser device.

As mentioned above, the width of the beam of the second laser device 110 may be selectively adjusted based upon the width of the modification 145. The width of the beam may be selectively adjusted by varying the optical configuration of the beam delivery assembly 115. According to some embodiments, the beam delivery assembly 115 may focus the output of the second laser device 110 to approximately 10 micrometers to 10 mm in width (based upon the width of the modification caused by the output of the first laser device, or approximately 1 to 100 micrometers).

In some embodiments, the system 100 may apply laser output from the first laser device 105 along the entire length of the beam path 140 of the material 130 before applying laser output from the second laser device 110 along the entire length of the beam path 140. In other embodiments, laser outputs of both the first and second laser devices 105 and 110 occur substantially simultaneously. That is, the application of the output of the second laser device 110 may occur after the application of the output of the first laser device 105. For example, a laser beam of the second laser device 110 may follow behind (at a predetermined distance) the laser beam of the first laser device 105, along the beam path 140.

While the above described examples contemplate separating a simple rectangular material into two separate rectangular sections, one of ordinary skill in the art will appreciate that the system 100 may be utilized to produce finely-shaped products from a stock material. For example, a sheet of strengthened glass may be processed to produce a plurality of touchscreen substrates according to the methods described above. The touchscreen substrates may have any desired geometrical configuration.

Additionally, fine details may be fabricated into the touchscreen substrates such as apertures or ports, utilizing the aforementioned processes.

In other exemplary uses, semiconductor substrates may be processed by the present technology. For example, features such as through-silicon vias may be fabricated into the semiconductor substrate with the use of the present technology.

According to some embodiments, rather than having separate first and second laser devices, the system may include a single laser generating and emitting device that can create a variety of laser output. For example, the single laser generating and emitting device can produce both short and long pulse duration laser beams. Moreover, the single laser generating and emitting device may also output laser beams that fall within any suitable wavelength.

With regard to both the first and second laser devices 105 and 110, it will be understood that these laser devices may utilize any one of a number of techniques for laser beam delivery (e.g., propagation toward, or within) a material. Non-limiting examples of laser beam delivery techniques include linear and/or non-linear optical propagation, static and/or transient waveguiding effects, optical diffraction, refraction, reflection, filamentation, self-focusing, along with any other techniques/devices for placement of laser energy relative to any of a volume, a plane, a line, or a point that would be known to one of ordinary skill in the art with the present disclosure before them.

Additionally, the combined effects of the laser devices disclosed herein may be configured for use in a wide variety of micro-fabrication applications that include, but are not limited to, shaping precious gemstones, semiconductor wafer scribing or singulation, surgical cutting of hard tissue, and marking of indicia such as serial numbers or part numbers inside transparent devices—just to name a few.

Referring back to FIG. 1, in operation, a stock of material 130 is placed upon the platform 125 of the system 100. In some embodiments, executable instructions may be utilized to selectively vary the operational characteristics of the system 100 to singulate products from a stock material. These instructions may be executed by the processor of a computing system (not shown) such as computing system 600 described with reference to FIG. 6. The computing system may be particularly purposed to control the operation of the system 100 to singulate materials.

The executable instructions may include laser parameters for the first laser device 105 that are selected based upon the physical properties of the material 130. The physical properties of the material 130 may be input by a user or input via data gather from one or more sensors (not shown). Next, the beam delivery assembly 115 is selectively adjusted to focus the beam of the first laser device 105 to a particular depth and width relative to the material 130. The output of the first laser device 105 is applied along a beam path 140 according to a desired product profile. That is, the beam path 140 approximates an outline of the desired product profile (e.g., rectangular, circular, polygonal, irregular, and so forth).

Application of the output of the first laser device 105 causes a modification 145 of the material properties of the material 130 along the beam path 140. To cause separation or singulation of the material 130 along the beam path 140, the laser parameters for the second laser 110 are selectively adjusted, again, based upon the physical properties of the material and the modification 145 induced within the material 130.

Next, the configuration of the beam delivery apparatus 115 is selectively adjusted. For example, the width of the beam of the second laser device 110 is selected such that the beam of the second laser device 110 is directed at portions of the material adjacent to the modification 145, as well as the modification 145 itself.

Application of the output of the second laser device 110 causes singulation or separation of the product (not shown) from the stock material 130 along at the modification 145 without imparting defects into the edge surfaces of the material 130 (or any other portion of the material 130).

Figure 6:
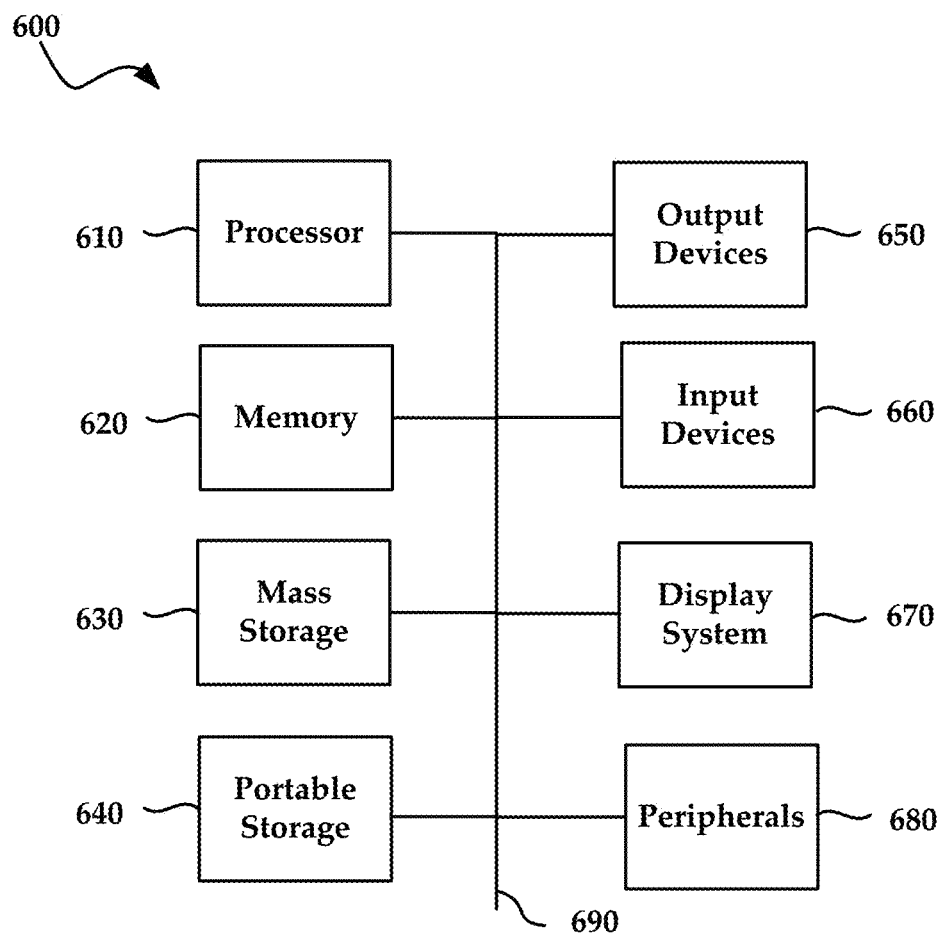
FIG. 6 illustrates an exemplary computing system that may be used to implement embodiments according to the present technology.

FIG. 6 illustrates an exemplary computing system 600 that may be used to implement an embodiment of the present technology. The system 600 of FIG. 6 may be implemented in the contexts of the likes of computing systems, networks, servers, or combinations thereof. The computing system 600 of FIG. 6 includes one or more processors 610 and main memory 620. Main memory 620 stores, in part, instructions and data for execution by processor 610. Main memory 620 may store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present technology for purposes of loading that software into main memory 620.

Portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present technology may be stored on such a portable medium and input to the computer system 600 via the portable storage device 640.

Input devices 660 provide a portion of a user interface. Input devices 660 may include an alphanumeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. Peripheral device(s) 680 may include a modem or a router.

The components provided in the computer system 600 of FIG. 6 are those typically found in computer systems that may be suitable for use with embodiments of the present technology and are intended to represent a broad category of such computer components that are well known in the art. Thus, the computer system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEP-ROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for material singulation, the method comprising:
   focusing a first laser output from a first laser device to a depth within a material, the depth being located between a top surface of the material and a bottom surface of the material, the focused first laser output having a beam width in the material, the first laser output comprising ultrafast laser pulses having a duration less than or equal to 50 picoseconds, the first laser output having a wavelength selected from near-infrared and visible wavelengths;
   applying the focused first laser output to the material along a beam path, an electric field of the ultrafast lasers pulses in the focused first laser output causing rapid acceleration of electrons, the focused first laser output thereby causing a permanent change in refractive index, optical absorption, density, or mechanical stress of the material exposed to the focused first laser output while the material exposed to the focused first laser output remains in a solid phase; and
   sequentially applying a second laser output from a second laser device to the material along and directly adjacent to the beam path, the second laser output heating the material or generating an acoustic shockwave in the material, thereby separating the material along the beam path while reducing impartation of defects into the material, the second laser output having a beam width larger than the beam width of the focused first laser output, the second laser output having a higher average power and a lower peak power relative to the first laser output.

2. The method according to claim 1, wherein the ultrafast laser pulses of the first laser output have a duration less than or equal to about one picosecond.

3. The method according to claim 1, wherein the material exposed to the first laser output is modified by any of:
   separating molecular bonds in material lattice;
   geometrical reorientation of molecular constituents; and
   spatial movement of molecular species.

4. The method according to claim 1, wherein the second laser output heats the material and causes a discontinuous stress gradient in the material.

5. The method according to claim 1, wherein the second laser output comprises a wavelength selected from a range of three to fifty micrometers, inclusive.

6. The method according to claim 1, wherein the second laser output comprises a wavelength selected from a range of 0.78 to three micrometers, inclusive.

7. The method according to claim 1, wherein a laser pulse duration of the second laser output is greater than or equal to ten picoseconds.

8. The method according to claim 1, wherein the second laser output includes a continuous wave output.

9. The method according to claim 1, wherein the steps of applying the first laser output and applying the second laser output occur within a second.

10. The method of claim 1, wherein the applying the second laser output to the body that was exposed to the first laser output causes complete separation of the material into two or more pieces.

11. The method of claim 1, wherein the first laser output and the second laser output are performed by using a single motion control.

12. The method of claim 1, further comprising selectively adjusting an amount of electronic energy excitation by varying parameters of a laser device including a beam delivery speed and a beam energy level.

13. The method of claim 1, further comprising inspecting the material by applying a light.

14. The method of claim 1, wherein the second laser output comprises a wavelength in a range of 11 micrometers to 50 micrometers.

* * * * *